(12) United States Patent
Byers et al.

(10) Patent No.: US 8,616,424 B2
(45) Date of Patent: Dec. 31, 2013

(54) CARRIER RACKS FOR VEHICLES

(76) Inventors: Wally Byers, Lake Oswego, OR (US);
Shawn McEuen, Portland, OR (US)

( * ) Notice: Subject to any disclaimer, the term of this patent is extended or adjusted under 35 U.S.C. 154(b) by 474 days.

(21) Appl. No.: 12/966,907

(22) Filed: Dec. 13, 2010

(65) Prior Publication Data

US 2011/0079621 A1    Apr. 7, 2011

Related U.S. Application Data

(60) Provisional application No. 61/285,888, filed on Dec. 11, 2009.

(51) Int. Cl.
*B60R 9/042* (2006.01)
*B60R 9/05* (2006.01)

(52) U.S. Cl.
USPC ............................ 224/310; 224/316; 224/924

(58) Field of Classification Search
USPC ......... 224/400, 309, 310, 316, 321, 282, 924; 414/462
See application file for complete search history.

(56) References Cited

U.S. PATENT DOCUMENTS

| | | | |
|---|---|---|---|
| 4,958,761 A * | 9/1990 | Tenney | 224/316 |
| 5,275,319 A * | 1/1994 | Ruana | 224/316 |
| 5,284,282 A * | 2/1994 | Mottino | 224/310 |
| 5,360,150 A | 11/1994 | Praz | |
| 5,360,151 A * | 11/1994 | Fine | 224/310 |
| 5,421,495 A * | 6/1995 | Bubik | 224/310 |
| 5,505,579 A * | 4/1996 | Ray et al. | 414/462 |
| 5,709,521 A * | 1/1998 | Glass et al. | 414/462 |
| 5,850,891 A * | 12/1998 | Olms et al. | 182/127 |
| 6,015,074 A * | 1/2000 | Snavely et al. | 224/310 |
| 6,131,781 A | 10/2000 | Murray | |
| 6,149,039 A * | 11/2000 | Englander | 224/310 |
| 6,425,507 B1 * | 7/2002 | Allen | 224/316 |
| 6,561,396 B2 * | 5/2003 | Ketterhagen | 224/310 |
| 6,634,529 B2 * | 10/2003 | Choiniere et al. | 224/310 |
| 6,681,970 B2 | 1/2004 | Byrnes | |
| 6,938,782 B2 * | 9/2005 | Dean et al. | 211/20 |
| 7,410,082 B2 * | 8/2008 | Stewart | 224/504 |
| 2002/0125281 A1 | 9/2002 | Byrnes | |
| 2006/0163296 A1 | 7/2006 | McMillan | |
| 2007/0175936 A1 | 8/2007 | Goyanko | |

* cited by examiner

*Primary Examiner* — Justin Larson
(74) *Attorney, Agent, or Firm* — Mohr Intellectual Property Law Solutions, PC

(57) ABSTRACT

Carrier racks including an elongate base member, a pivot mechanism mounted to the base member and configured to rotate relative to the base member, and a frame coupled to the pivot mechanism for supporting cargo, wherein the pivot mechanism is configured to pivot the frame between a loading position and a stowed position for transport, a first support member of the frame being oriented substantially horizontal in the stowed position.

20 Claims, 13 Drawing Sheets

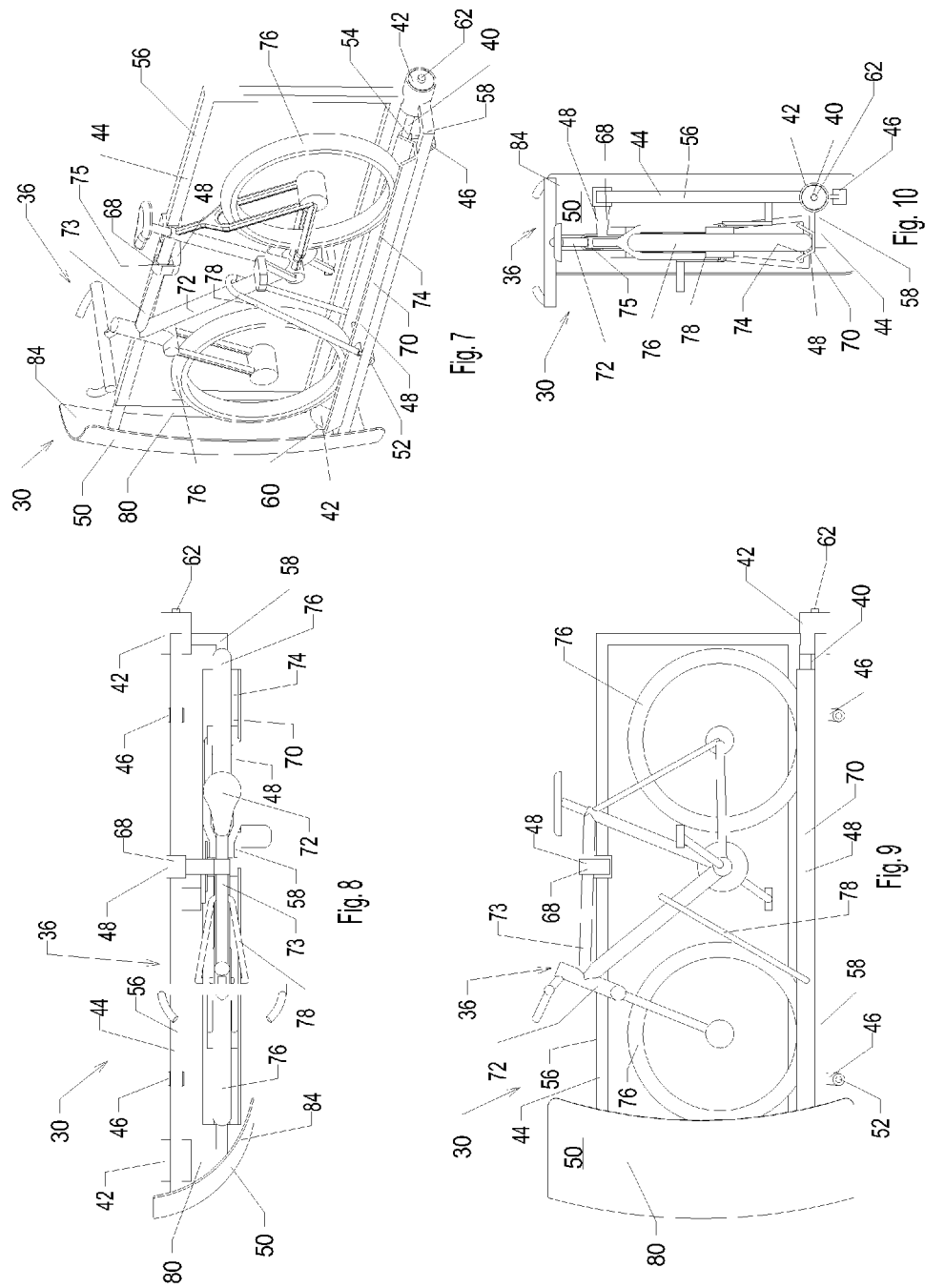

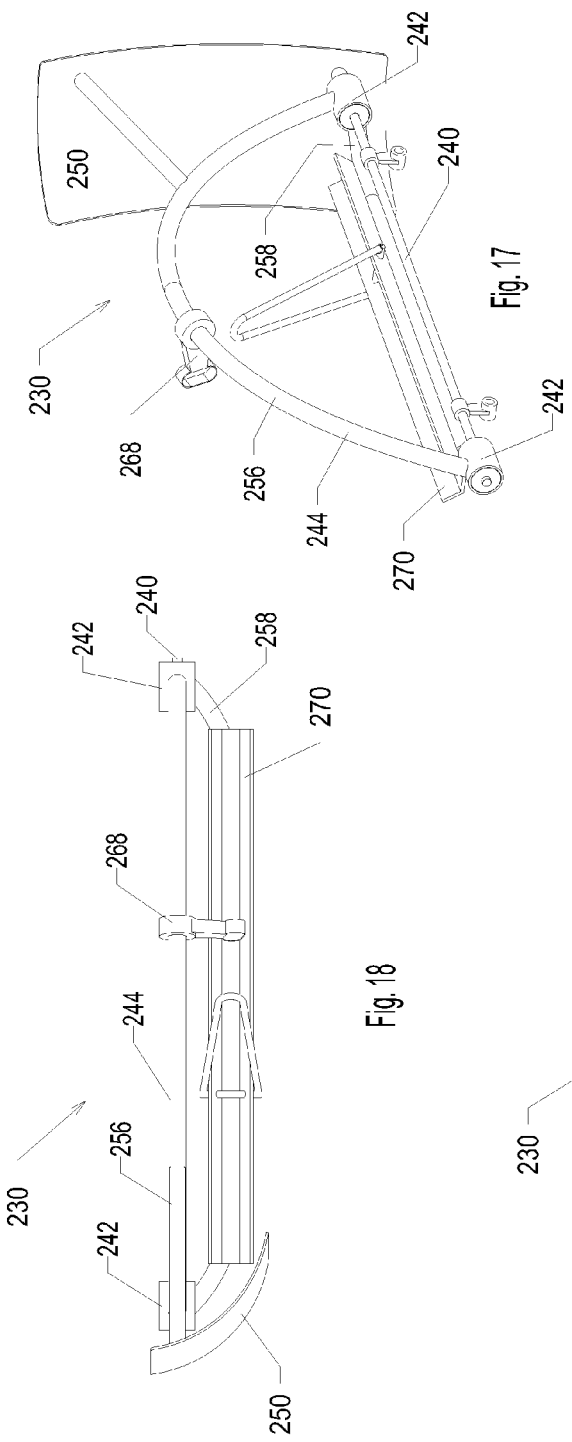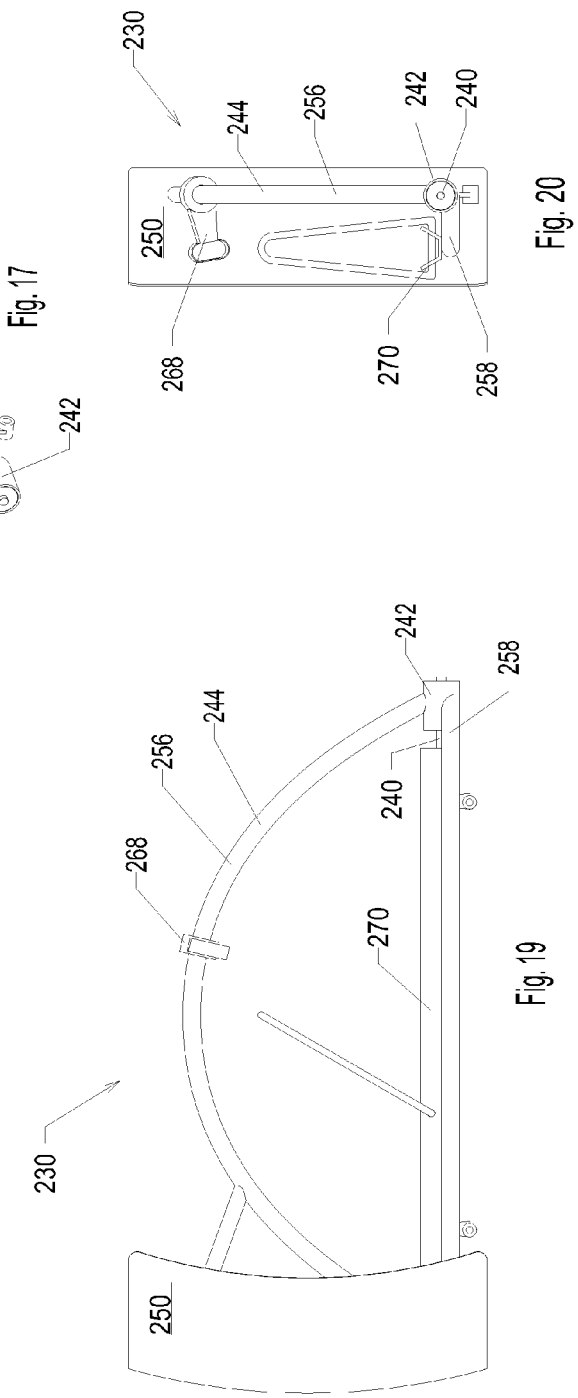

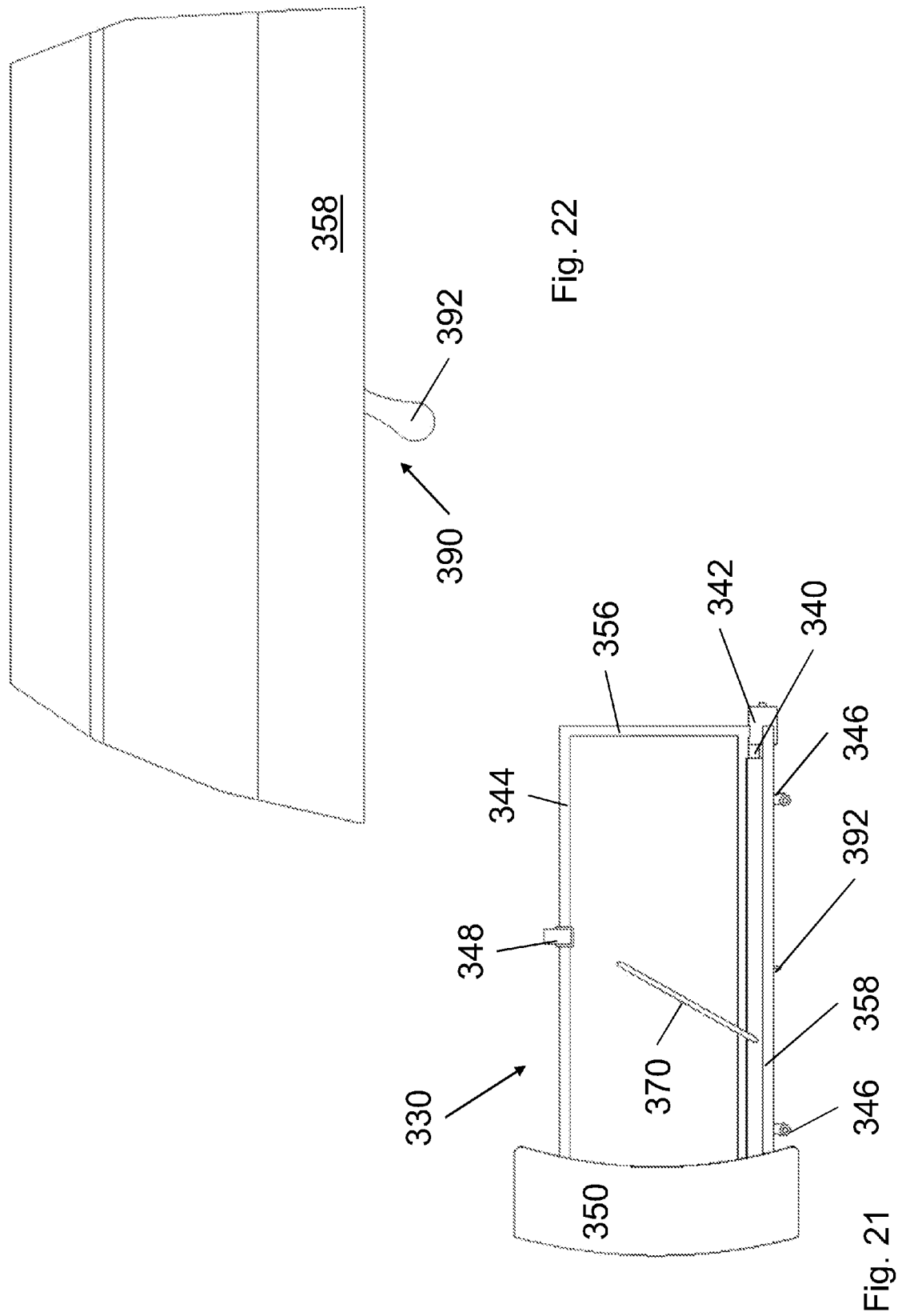

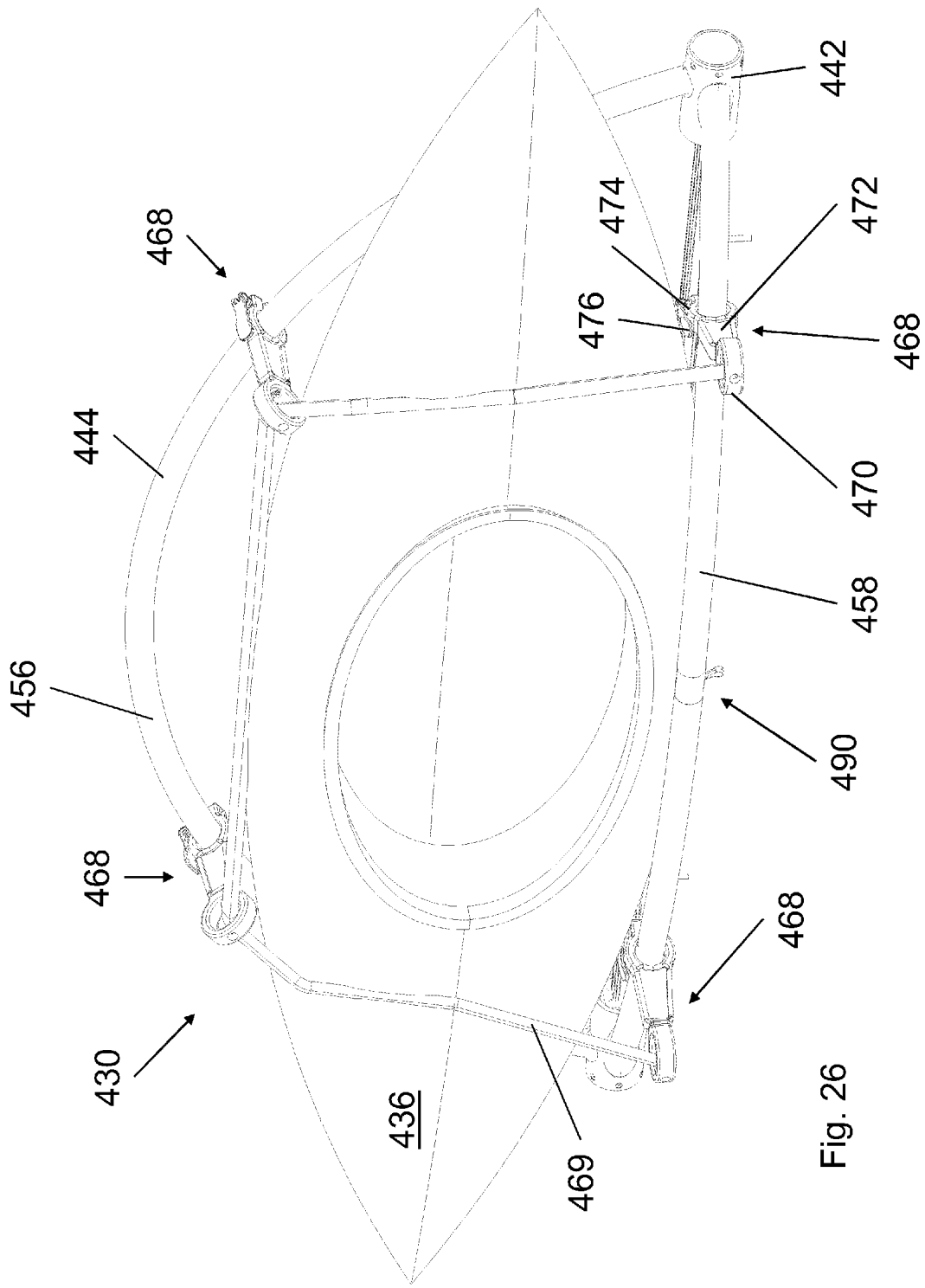

CARRIER RACKS FOR VEHICLES

This application claims the benefit of U.S. application Ser. No. 61/285,888, filed on Dec. 11, 2009, which is hereby incorporated by reference for all purposes.

BACKGROUND

The present disclosure relates generally to carrier racks for vehicles. Carrier racks are configured to mount to vehicles and enable persons to transport cargo from one location to another location. Transporting cargo can be useful for a variety of activities, including recreation, travel and utilitarian endeavors.

However, known carrier racks have certain limitations that render them less than wholly satisfactory. For example, know carrier racks secure bicycles and other cargo in an upright orientation on top of the vehicle, which causes the cargo to extend to a height that is incompatible with structures such as garages, car ports, parking garage entrances, and certain bridges. Further, known carrier racks do not provide for an aerodynamic profile, which increases drag and thus causes the vehicle's fuel economy to suffer. Moreover, known carrier racks do not provide a convenient means to load cargo in one orientation and then to position the cargo in another orientation.

Thus, there exists a need for carrier racks that improve upon and advance the design of known carrier racks. Examples of new and useful carrier racks relevant to the needs existing in the field are discussed below.

Disclosure addressing one or more of the identified existing needs is provided in the detailed description below. Examples of references relevant to carrier racks include U.S. Pat. Nos. 4,958,761, 5,275,319, 5,284,282, 5,360,151, 5,421,495, 5,505,579, 5,709,521, 6,149,039, 6,634,529, 6,634,529, 6,938,782, and 7,410,082. The complete disclosures of the above patents and patent applications are herein incorporated by reference for all purposes.

SUMMARY

The present disclosure is directed to carrier racks including an elongate base member, a pivot mechanism mounted to the base member and configured to rotate relative to the base member, and a frame coupled to the pivot mechanism for supporting cargo, wherein the pivot mechanism is configured to pivot the frame between a loading position and a stowed position for transport, a first support member of the frame being oriented substantially horizontal in the stowed position.

BRIEF DESCRIPTION OF THE DRAWINGS

FIG. 7 is a perspective view of the carrier rack shown in FIG. 3 supporting and securing a bicycle.

FIG. 8 is a top view of the carrier rack shown in FIG. 3 supporting and securing a bicycle.

FIG. 9 is a side view of the carrier rack shown in FIG. 3 supporting and securing a bicycle.

FIG. 10 is an end view of the carrier rack shown in FIG. 3 supporting and securing a bicycle.

FIG. 17 is a perspective view of a third example of a carrier rack, the carrier rack including a curved frame.

FIG. 18 is a top view of the carrier rack shown in FIG. 17.

FIG. 19 is a side view of the carrier rack shown in FIG. 17.

FIG. 20 is an end view of the carrier rack shown in FIG. 17.

FIG. 21 is a side elevation view of a fourth example of a carrier rack, the carrier rack including a release mechanism for selectively releasing a pivot mechanism from holding a frame in a fixed position relative to an elongate base member.

FIG. 22 is a close up view of the release mechanism shown in FIG. 21 depicting the release mechanism being mounted within a frame.

FIG. 26 is a perspective view of the carrier rack shown in FIG. 25 supporting and securing a kayak.

DETAILED DESCRIPTION

The disclosed carrier racks will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of carrier rack examples are provided. Related features in the examples may be identical, similar, or dissimilar in different examples. For the sake of brevity; related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
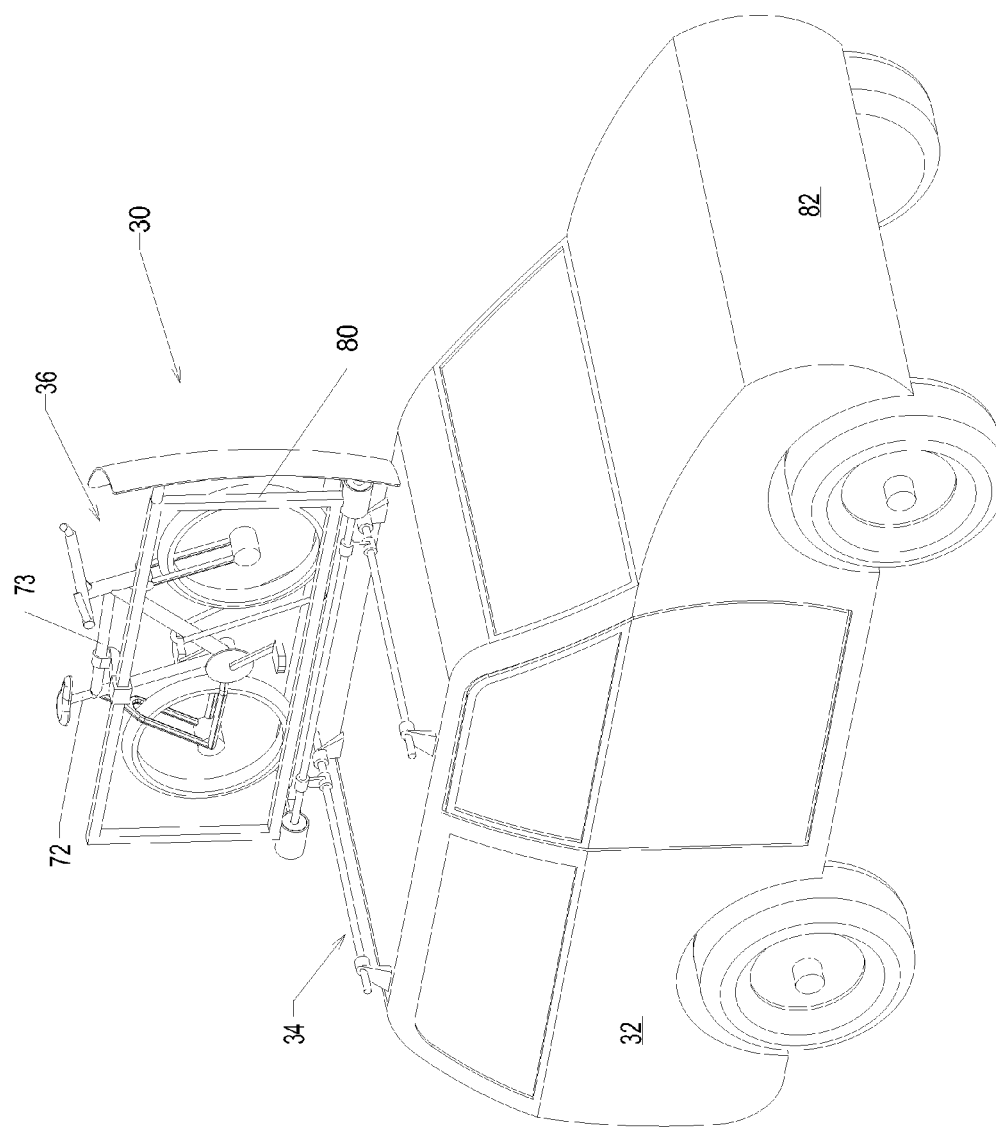
FIG. 1 is a perspective view of a first example of a carrier rack, the carrier rack being mounted on a vehicle and supporting a bicycle in a loading position.
Figure 2:
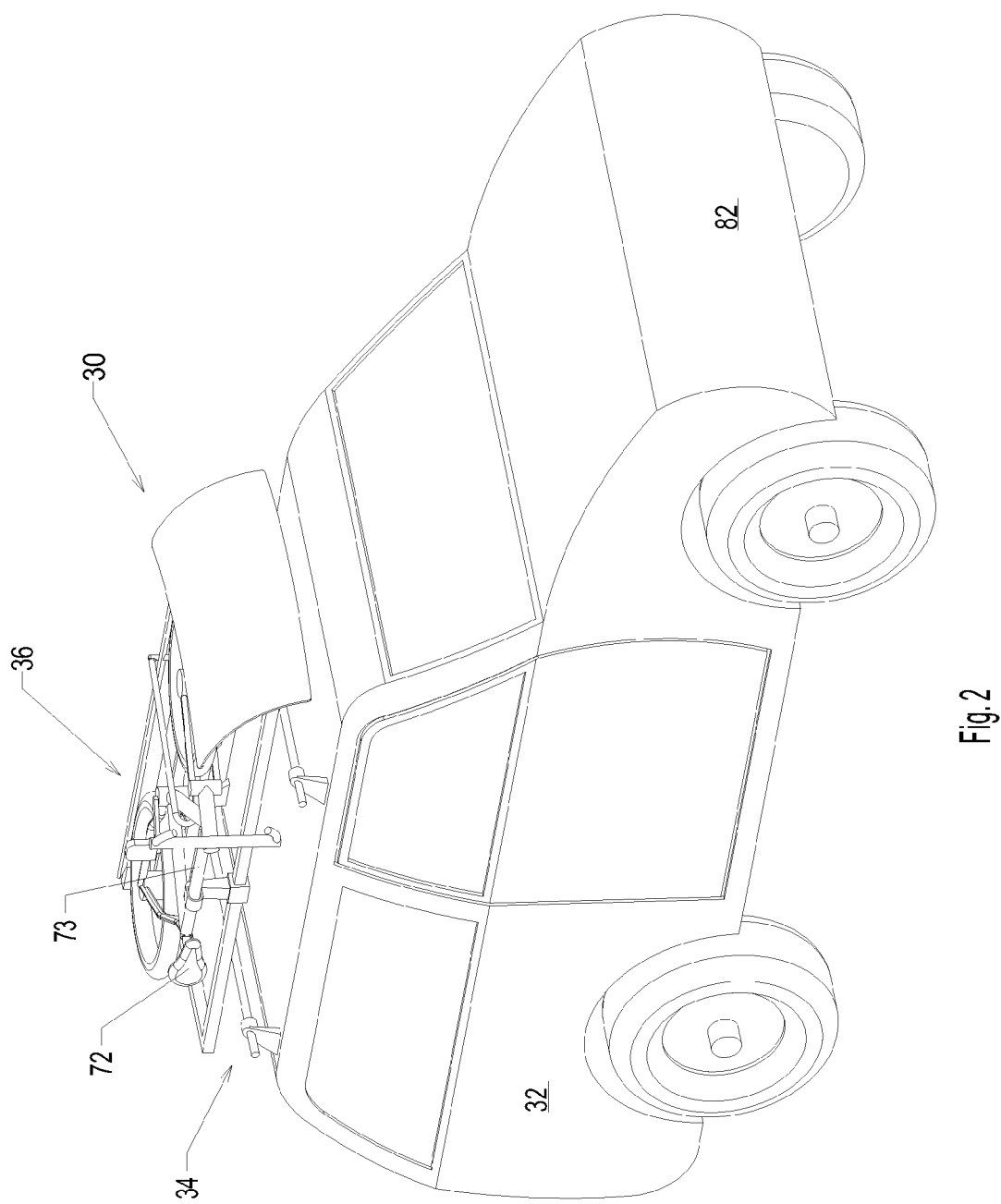
FIG. 2 is a perspective view of the carrier rack shown in FIG. 1 mounted on a vehicle and supporting a bicycle in a stowed position.

With reference to FIGS. 1 and 2, a carrier rack 30 is shown mounted on a vehicle 32, which includes a roof rack 34. Cargo 36 is secured to carrier rack 30 to be transported by vehicle 32. Cargo 36 may be any manner of item or accessory, such as bicycles, skis, tools, luggage, watercraft, paddies, golf clubs, and assorted recreation gear.

In the example shown in FIGS. 1 and 2, vehicle 32 is depicted as a sport-utility-vehicle. However, carrier rack 30 may be used with any variety of vehicle, including passenger cars, trucks, utility vehicles, busses, trains, and subways. Vehicle 32 includes one example of a roof rack, but the reader should understand that carrier rack 30 may be readily configured for use with a wide variety of roof rack examples. In some examples, carrier rack 30 is configured to mount directly to a vehicle, such as on a vehicle's roof, in a vehicles trunk, or in a vehicle's rear cargo area.

As can be seen when viewing FIGS. 1 and 2 in sequence, a frame 44 of carrier rack 30 is configured to pivot between a loading position and a stowed position. The loading position is for receiving and securing cargo 36 to carrier rack 30 and is shown in FIG. 1. The stowed position is for transporting cargo 36 with vehicle 32 and is shown in FIG. 2.

The range of motion of frame 44 shown in FIGS. 1 and 2 is just one example of the contemplated range of motion. In the example shown in FIGS. 1 and 2, frame 44 pivots substantially 90° between the loading position and the stowed position. In other examples, the frame pivots substantially 180° or 270° or any angle therebetween when pivoting between the loading position and the stowed position.

With particular reference to FIGS. 3-6, and also to FIGS. 1, 2, and 7-10, in one example carrier rack 30 includes an elongate base member 40, a pivot mechanism 42, and a frame 44. Additional and/or optional features of carrier rack 30 include a vehicle mount 46, a cargo mount 48, and an aerodynamic shield 50. A variety of additional or alternative features not shown in the figures may also be included, such as locking devices to secure the cargo in place and or secure the carrier rack in a desired position, pivot assist mechanisms, and cargo enclosures to protect cargo from the elements.

In the example shown in FIGS. 1-10, elongate member base member 40 is a shaft with a circular cross section. However, any suitable shape for the shaft may be used, such as triangular, square, rectangular, hexagonal, and irregular. A shaft with a circular cross section has been observed to be especially suitable for facilitating rotation of carrier rack 30, but other shapes can accommodate rotation with a complimentarily configured pivot mechanism. With brief reference to FIG. 24, an elongate base member with a substantially star-shaped cross section is shown as another possible elongate base member design.

Frame 44 serves to support cargo 36 in a variety of positions. In the example shown in FIGS. 1-10, frame 44 includes a first support member 56 and a second support member 58. First support member 56 is oriented transverse to second support member 58 and substantially horizontal in the stowed position. In the particular example shown in FIGS. 1-10, first support member 56 is oriented perpendicular to second support member 58.

Figure 3:
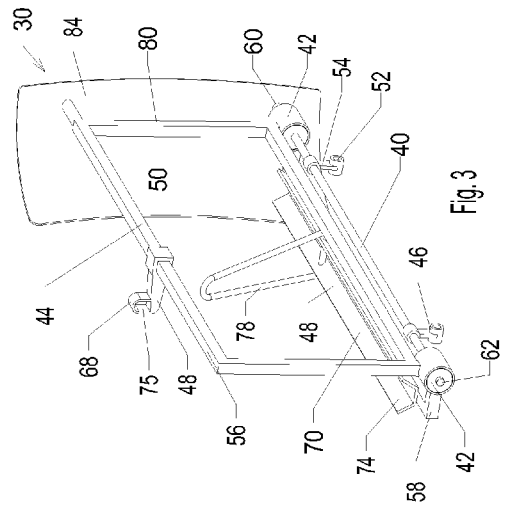
FIG. 3 is a perspective view of the carrier rack shown in FIG. 1 detached from a vehicle.
Figure 6:
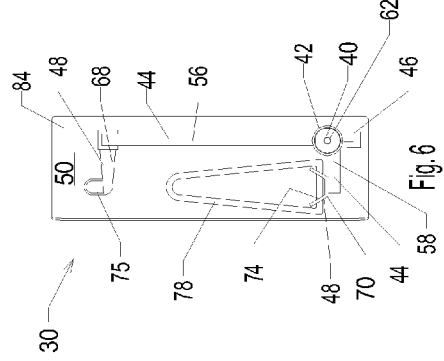
FIG. 6 is an end view of the carrier rack shown in FIG. 3.
Figure 4:
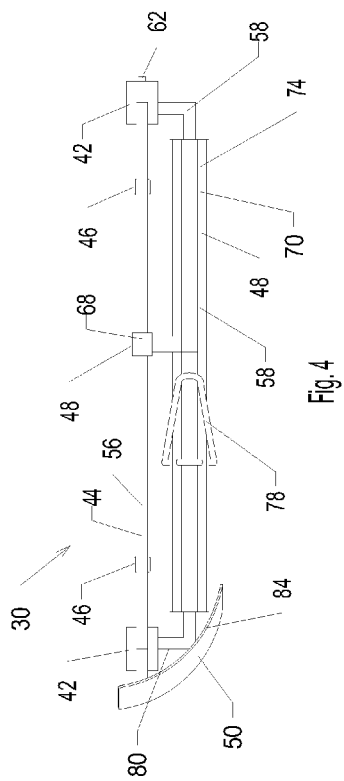
FIG. 4 is a top view of the carrier rack shown in FIG. 3.
Figure 5:
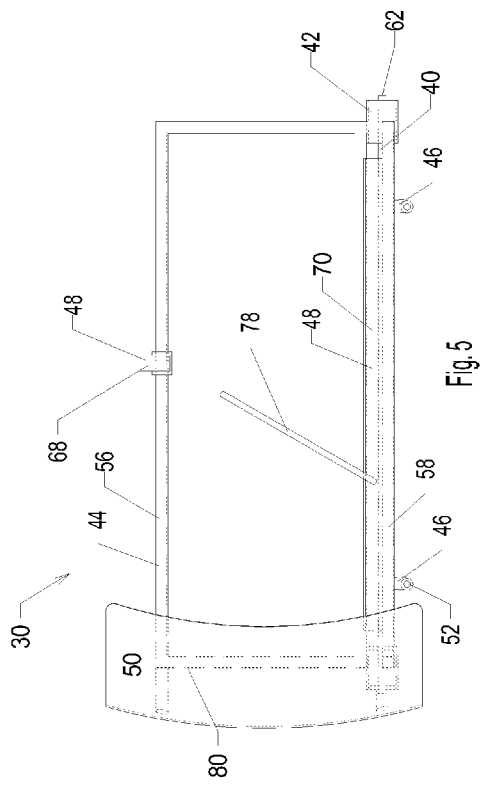
FIG. 5 is a side view of the carrier rack shown in FIG. 3.

First support member 56 may alternatively be described as extending in two dimensions from a first end 60 of elongate base member 40 toward a second end 62 of elongate base member 40 longitudinally opposite first end 60. In this manner, first support member 56 defines a first plane. Second support member 58 may be alternatively described as extending in two dimensions from first end 60 toward second end 62 to define a second plane. As can be seen in FIG. 3, the second plane defined by second support member 58 is oriented transverse, indeed perpendicular, to the first plane defined by first support member 56.

In the example shown in FIGS. 1-10, first support member 56 and elongate base member 40 collectively define a rectangle. The rectilinear shape of first support member 56 shown in FIGS. 1-10 may simplify manufacturing and/or provide support at different locations as compared to first support members having other shapes.

The reader should understand that the first support member may take any variety of shape, such as square, triangular, or other regular polyhedron, or circular or oval, or an irregular shape for different applications and purposes. For example, FIGS. 17-20 depict an arched first support member 256. The arch shape of first support member 256 improves the aerodynamic profile of carrier rack 230 in the direction of airflow by decreasing the area of the profile of frame 244. Further, an arched first support member may provide enhanced rigidity and be more compact than other shapes.

It is important that the reader understand that the first support member need not define a plane in all examples. Indeed, the first support member may additionally or alternatively extend in three dimensions to accommodate different cargo and applications.

In the example shown in FIGS. 1-10, first support member 56 is depicted to be larger than second support member 58. However, in other examples the first and second support members are roughly the same size. In still other examples, the second support member is larger than the first support member.

Pivot mechanism 42 enables frame 44 to pivot between a loading position and a stowed position. In the example shown in FIGS. 1-10, first support member 56 is substantially upright or vertical, i.e., at substantially a 90° angle relative to the roof of vehicle 32 in the loading position. In the stowed position, first support member 56 is substantially horizontal or substantially at a 0° angle relative to the roof of vehicle 32. Thus, in the example shown in FIGS. 1-10, the pivot angle between the loading position and the stowed position is approximately 90°.

In other examples, pivot angle between the loading position and the stowed position is approximately 180° or 270°. For instance, in one example the first support member in the loading position is substantially 180° from the first support member in the stowed position, which is substantially horizontal or at 0° relative to the vehicle's roof or floor. In another example, the first support member in the loading position is substantially 270° from the first support member in stowed position, which is substantially horizontal or at 0° relative to the vehicle's roof or floor.

In the loading position, the second support member may be oriented in an upright orientation (90° relative to the roof), a horizontal orientation (180° as shown in FIG. 1, a downward orientation (270°), or an angled orientation (91°-179° or 181°-269°).

In the examples shown in FIGS. 1-10, carrier rack 30 includes two pivot mechanisms configured to pivot frame 44 about an axis coaxial with elongate base member 40. However, in some examples a single pivot mechanism is used. For instance, a single pivot mechanism supporting the elongate base member from a first end and a bearing supporting the elongate base member from a second end opposite the first end may be used. In other examples, carrier rack 30 includes three or more pivot mechanisms.

In some examples, one or more pivot mechanisms include extension members to space portions of the frame from the vehicle in the loading position. Portions of the frame being spaced from the vehicle in the loading position may make it easier to load cargo onto the carrier rack. Additionally or alternatively, spacing the frame from the vehicle may reduce damage to the vehicle from a user inadvertently bumping or scraping cargo against the vehicle while loading cargo onto the carrier rack.

The elongate base member may be mounted proximate the longitudinally extending edge of the vehicle, either on the driver's side or the passenger's side, to extend the second support member beyond the periphery or boundary of the vehicle in the loading position. For example, as shown in FIGS. 1-1.0 elongate base member 40 is mounted on the far lateral edge of vehicle 32 on the driver's side to cause second support member 58 to extend beyond the driver's side of vehicle 32 when frame 44 is pivoted to the loading position. By extending second support member 58 beyond the boundary of vehicle 32, the user is able to more conveniently and ergonomically load and secure cargo onto second support member 58 and frame 44 as a whole. Further, the user is less likely to "ding" the side of vehicle 32 with the cargo while loading it because second support member 58 is spaced from the vehicle.

The pivot mechanisms may be any known mechanism configured to pivot about an axis. In the example shown in FIGS. 1-10, pivot mechanisms 42 are simple bearings mounted on elongate base member 40 and configured to rotate about elongate base member 40. In other examples, the pivot mechanism is a rolling element bearing, such as a ball bearing, a fluid bearing, a magnetic bearing, or a flexure bearing.

In some examples, the pivot mechanism includes a clutch mechanism and a biasing mechanism to mechanically assist with pivoting the frame. In one example, the combined effect of these features is to counteract the weight of the frame and cargo such that pivoting the frame requires less force supplied by the user. This may be described as a neutral state or weight compensated state. The biasing mechanism may include a spring and/or gas shocks.

In the example shown in FIGS. 1-10, carrier rack 30 includes vehicle mount 46 for selectively securing elongate base member 40 to roof rack 34. Although one particular embodiment of a vehicle mount is shown in the figures and discussed herein, the reader should understand that a wide range of vehicle mount designs are contemplated. Further, any suitable known vehicle mount for securing a carrier rack to a roof rack may be effectively utilized with carrier rack 30.

As shown in FIGS. 1-10, vehicle mount 46 defines, at opposing ends, a first aperture 52 and a second aperture 54 extending in a transverse direction to first aperture 52. First aperture 52 is sized to receive a crossbar of roof rack 34 to secure vehicle mount 46 to roof rack 34. Second aperture 54 is sized to receive elongate base member 40 to secure vehicle mount 46 to elongate base member 40.

First aperture 52 enables vehicle mount 46, and therefore carrier rack 30, to slide along roof rack 34 to a desired position. Similarly, second aperture 54 enables vehicle mount 46 to slide along elongate base member 40 to a desired position. Suitable locking devices, such as clamps, clips, or latches, may be included to selectively hold vehicle mount 46 in a desired position relative to roof rack 34 and elongate base member 40.

In the example shown in FIGS. 1-10, elongate base member 40 extends in a direction transverse to the direction of the racks in roof rack 34 for stability. But, in other examples, the elongate base member extends in other directions, such as aligned with or parallel to the racks in the roof rack. In some examples, the elongate base member extends diagonally across the racks of the roof rack.

As the direction of elongate base member 40 determines the pivoting direction of frame 44, the direction of elongate base member 40 may be selected to provide the desired direction of pivoting. For example, the elongate base member may be positioned to extend transverse to the direction of travel of the vehicle and proximate the rear of the lick to cause the frame to pivot opposite the direction of travel toward the front of the vehicle. In such an example, the first support member is disposed near the rear of the vehicle in the loading position and substantially horizontal and overlying the roof the vehicle in the stowed position.

In another example, the elongate base member is positioned extending transverse to the direction of travel of the vehicle and proximate the front of the vehicle to cause the frame to pivot in the direction of travel toward the rear of the vehicle. In such an example, the first support member is disposed near the front of the roof of the vehicle in the loading position and substantially horizontal and overlying the roof of the vehicle in the stowed position.

In the example shown in FIGS. 1 and 2, elongate base member 40 is positioned substantially parallel with the direction of travel and proximate the driver's or port side of vehicle 32. In a related example, the elongate base member is positioned substantially parallel the direction of travel and proximate the passenger's or starboard side of the vehicle. As shown in FIGS. 1 and 2, first support member 56 is proximate the driver's or port side of vehicle 32 in the loading position and first support member 56 is substantially horizontal and overlying the roof of vehicle 32 in the stowed position.

In the example shown in FIGS. 1-10, carrier rack 30 includes a cargo mount 48 configured to secure cargo 36 to frame 44. In fact, the carrier rack 30 example shown in FIGS. 1-10 includes a first cargo mount 68 and a second cargo mount 70. In some examples, the carrier rack includes a single cargo mount and in other examples includes more than two cargo mounts, such as a plurality of cargo mounts.

First cargo mount 68 is coupled to first support member 56 for securing cargo 36 to first support member 56. Second cargo mount 70 is coupled to second support member 58 for securing cargo to second support member 58.

In the particular example shown in FIGS. 1-10, cargo mount 68 is slidingly coupled to first support member 56. However, in other examples the first cargo mount is fixedly secured to the first support member. Slidingly connecting first cargo mount 68 enables it to secure cargo 36 to first support member 56 from a desired location along first support member 56.

One or more of the cargo mounts may be specially configured to mount specific cargo to frame 44, such as a bicycle, a kayak, skis, or tools. For example, as shown in FIGS. 1-10 first and second cargo mounts 68, 70 are configured to support a bicycle 72. With particular reference to FIGS. 3 and 6-10, first cargo mount 68 defines a selectively closeable aperture 75 sized to receive a top tube 73 of a bicycle 72.

As can be seen in FIGS. 1-10, second cargo mount 70 defines a trough 74 for receiving a wheel 76 of bicycle 72. Second cargo mount 70 further includes a restraining member 78 for securing wheel 76 within trough 74. Restraining member 78 in FIGS. 1-10 includes a bent rod pivotally mounted to trough 74, and in other examples includes a straight shaft, a flexible cord, such as a bungee cord, a wheel well, or a strap.

The reader should note that when the second cargo mount is specially configured to secure a bicycle, may include any conventional bicycle mounting device known in the art. For example, the second cargo mount may include a trough bike mount as shown in FIGS. 1-10, a fork mount rack, or a clamp configured to secure to a down tube or a seat post of the bicycle. A fork mount rack, such as a Copperhead™ rack, is configured to secure the front wheel forks of a bicycle, typically when the front wheel has been removed. One or more of the bicycle mounting de ices may include connecting arms to assist with securing the bicycle.

In the example shown in FIGS. 1-10, carrier rack 30 includes an optional aerodynamic shield 50. Shield 50 is mounted to frame 44 at a forward position 80 proximate a front position 82 of vehicle 32. Shield 50 smoothly diverts or deflects airflow at least partially around cargo 36 in a manner that improves the aerodynamics of carrier rack 30 as compared to airflow contacting blunt faces and irregular shapes of cargo 36 and/or frame 44.

In the example shown in FIGS. 1-10, aerodynamic shield 50 has a shield profile in the direction of airflow large enough to cover a corresponding frame profile of frame 44 and deflect airflow at least substantially around frame 44. As can be seen in FIGS. 1-10, aerodynamic shield 50 defines a cavity 84 and a portion of frame 44 extends into cavity 84.

Turning attention to FIGS. 11-16, a second example of a carrier rack will now be described. Carrier rack 130 includes many similar or identical features to carrier rack 30. Thus, for the sake of brevity, each feature of carrier rack 130 will not be redundantly explained. Rather, key distinctions between carrier rack 130 and carrier rack 30 will be described in detail and the reader should reference the discussion above for features substantially similar between the two carrier racks.

As can be seen in FIGS. 11-16, carrier rack 130 includes an elongate base member 140, pivot mechanisms 142, a frame 144, and an optional aerodynamic shield 150. Carrier rack 130 is specially configured to support and secure skis 172. To this end, carrier rack 130 may include a cargo mount that embodies any known ski rack mounting system.

In one example, carrier rack 130 includes a set of cargo mounts defining recesses into which a pair of skies may be laterally inserted. Two or more cargo mounts may be longitudinally aligned such that a longitudinal front portion of a pair of skis is supported by a front cargo mount and a longitudinal rear portion of a pair of skis is supported by a rear cargo mount. In some examples, the recesses of the cargo mount are angled downward to employ gravity to seat the skis more securely within the recess.

The cargo mount may include a restraining member that is able to be selectively positioned adjacent the recess to hold the skis within the recesses. The restraining member may be a strap, cord, or bar that pivots or otherwise moves relative to the recess. The cargo mount may include a locking mechanism to lock the restraining member in a position adjacent the recess to restrict removal of the skis.

Figure 11:
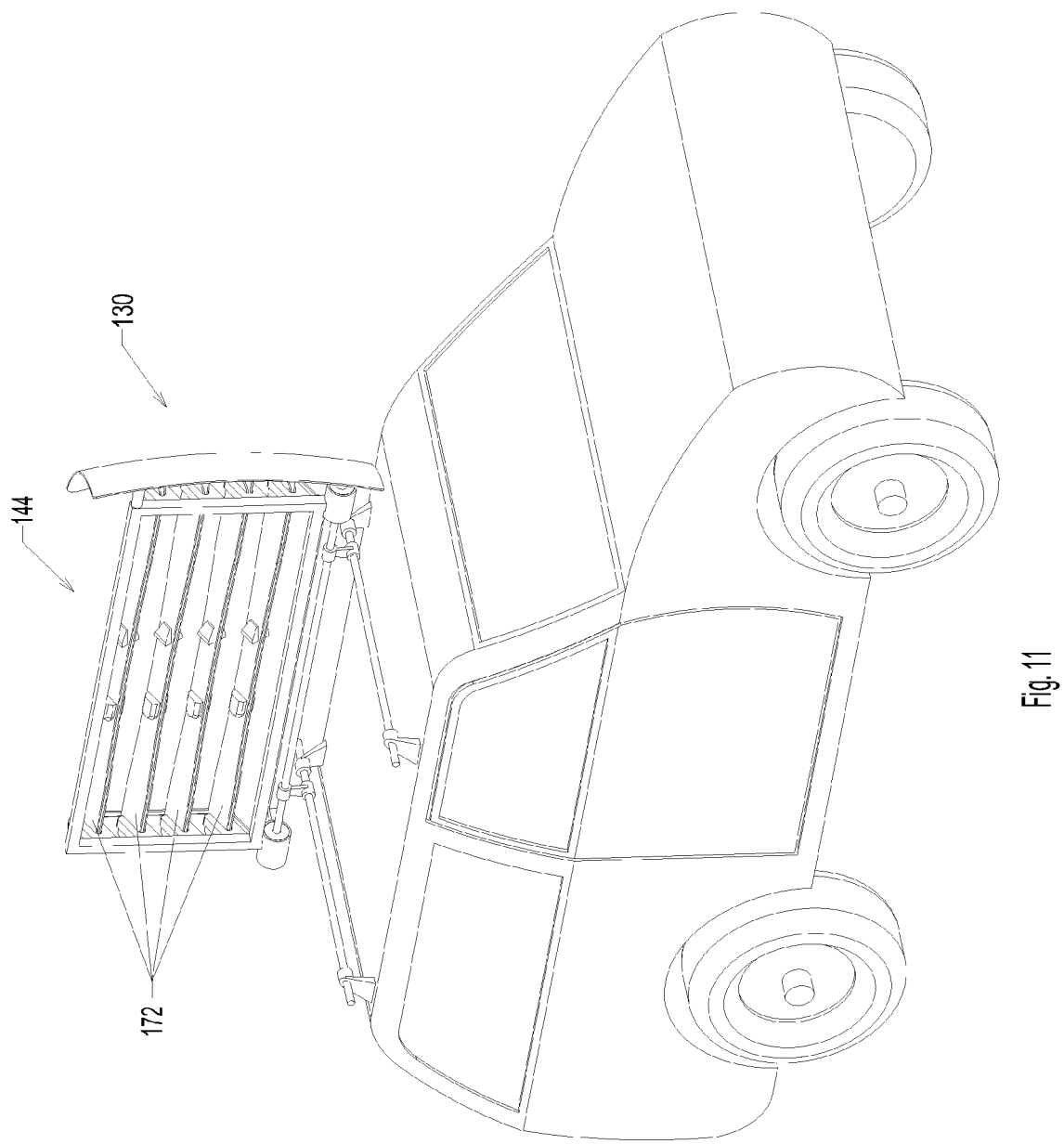
FIG. 11 is a perspective view of a second example of a carrier rack, the carrier rack being mounted on a vehicle and supporting skis in a loading position.
Figure 12:
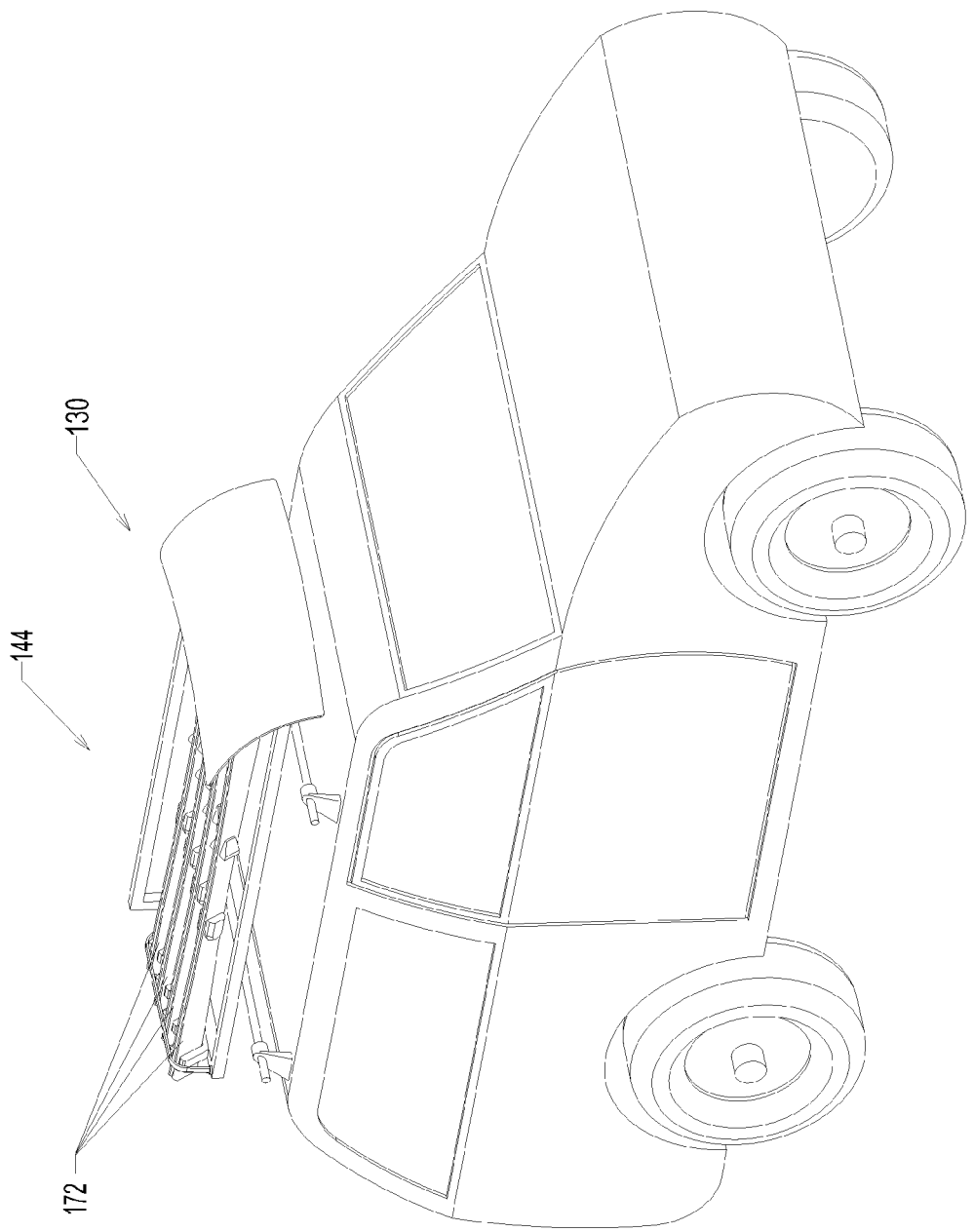
FIG. 12 is a perspective view of the carrier rack shown in FIG. 11 detached from a vehicle and supporting skis in a stowed position.
Figure 13:
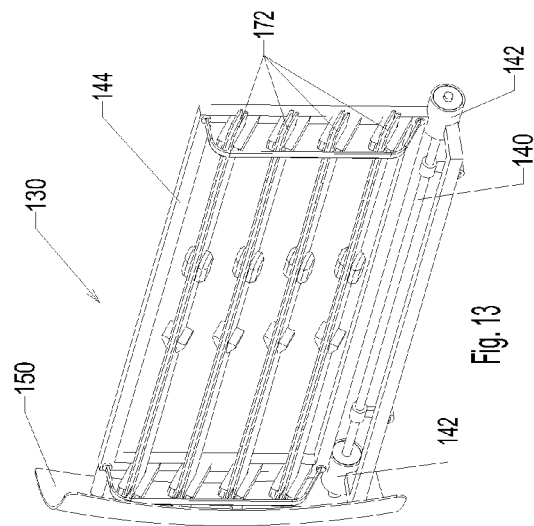
FIG. 13 is a perspective view of the carrier rack shown in FIG. 11 detached from a vehicle and supporting and securing skis.
Figure 16:
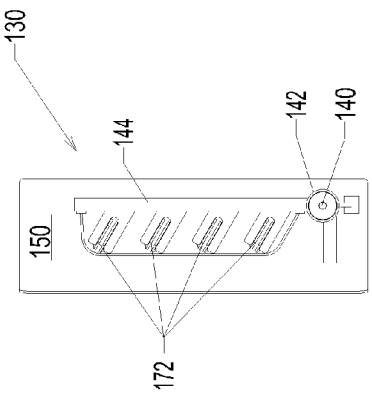
FIG. 16 is an end view of the carrier rack shown in FIG. 13 supporting and securing skis.
Figure 14:
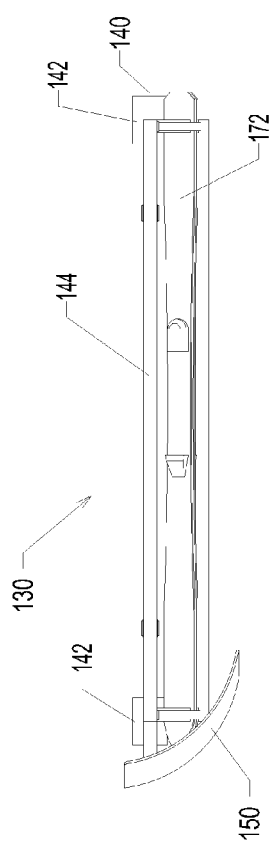
FIG. 14 is a top view of the carrier rack shown in FIG. 13 supporting and securing a skis.
Figure 15:
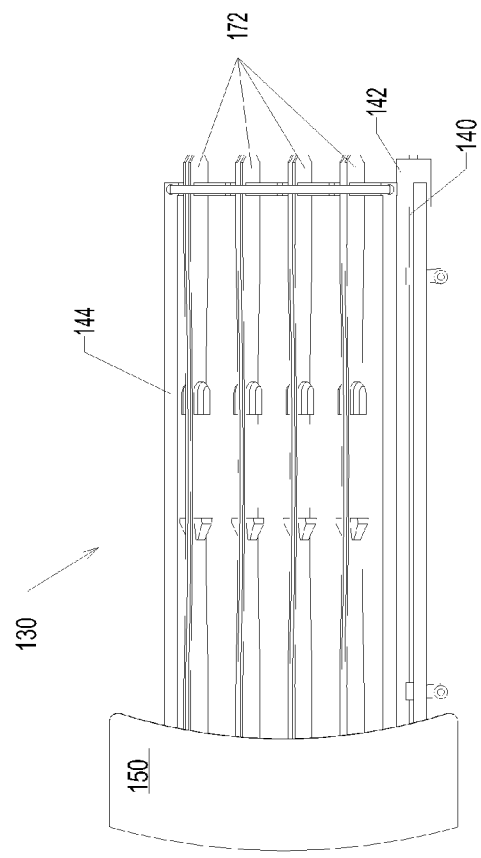
FIG. 15 is a side view of the carrier rack shown in FIG. 13 supporting and securing skis.

As can be seen by comparing FIGS. 11 and 12, carrier rack 130 is configured to pivot frame 144 between a loading position and a substantially horizontal stowed position above the roof of the vehicle.

Turning attention to FIGS. 17-20, a third example of a carrier rack will now be described. Carrier rack 230 includes many similar or identical features to carrier racks 30 and 130. Accordingly, each feature of carrier rack 230 will not be redundantly explained. Rather, key distinctions between carrier rack 230 and carrier racks 30 and 130 will be described in detail. The reader may reference the discussion above for features substantially similar between the carrier racks.

As can be seen in FIGS. 17-20, carrier rack 230 includes an elongate base member 240, pivot mechanisms 242, a frame 244, and an optional aerodynamic shield 250. As with the carrier racks described above, carrier rack 230 is configured to pivot frame 244 between a loading position and a substantially horizontal stowed position above the roof of a vehicle.

Carrier rack 230 may support a wide variety of cargo. In the example depicted in FIGS. 17-20, carrier rack 230 is specially configured to support and secure a bicycle. For supporting a bicycle, carrier rack 230 includes a first cargo mount 268 and a second cargo mount 270. First and second cargo mounts 268 and 270 are substantially similar to first and second cargo mounts 68 and 70 in this present example. In other examples, the first and second cargo mounts include additional or alternative features to secure and support a bicycle, such as straps, chains, cords, clamps, magnets, and hooks.

As can be seen in FIGS. 17-20, frame 244 includes a first support member 256 that defines an arch. The arch shape of first support member 256 has been observed to improve the aerodynamics of frame 244. Further, the arch shape provides a range of vertical and horizontal positions for first cargo mount 268 to couple cargo to first support member 256.

As can further be seen in FIGS. 17-20, carrier rack 230 also includes a second support member 258 that defines an arch. However, the second support member may not form an arch in all examples. In some examples, the second support member defines a partial arch shape, a rectilinear shape, or an irregular shape. The shape of the second support member may be selected to support a particular type of cargo mount, such as a Copperhead™ fork-type bicycle mount.

Turning attention to FIGS. 21-24, a fourth example of a carrier rack will now be described. Carrier rack 330 shown in FIGS. 21-24 includes many similar or identical features to carrier racks 30, 130, and 230. Accordingly, each feature of carrier rack 330 will not be redundantly explained. Rather, key distinctions between carrier rack 330 and carrier racks 30, 130, and 230 will be described in detail. The reader may reference the discussion above for features substantially similar between the carrier racks.

As shown in FIG. 21, carrier rack 330 includes an elongate base member 340, a first pivot mechanism 342, a second pivot mechanism (not pictured) and a frame 344. Frame 344 includes a first support member 356 and a second support member 358.

Carrier rack 30 further includes a vehicle mount 346, a first cargo mount 348, a second cargo mount 370, and an aerodynamic shield 350. As shown in FIGS. 21-24, carrier rack 330 includes a release mechanism 390 for selectively releasing first pivot mechanism 342 and the second pivot mechanism from holding frame 344 in a fixed position relative to elongate base member 340. Indeed, the pivot mechanisms and the release mechanism cooperate to selectively hold frame 344 in a fixed position relative to elongate base member 340 and to selectively release frame 344 to move relative to elongate base member 340.

First pivot mechanism 342 is identical to the second pivot mechanism; thus, only first pivot mechanism 342 need be described in detail. In some examples, the carrier rack includes a single pivot mechanism. For instance, the carrier rack may include a single pivot mechanism on one end of the elongate base member and a simple pivot or bearing supporting the frame and enabling the frame to freely rotate on the other end of the elongate base member.

Figure 24:
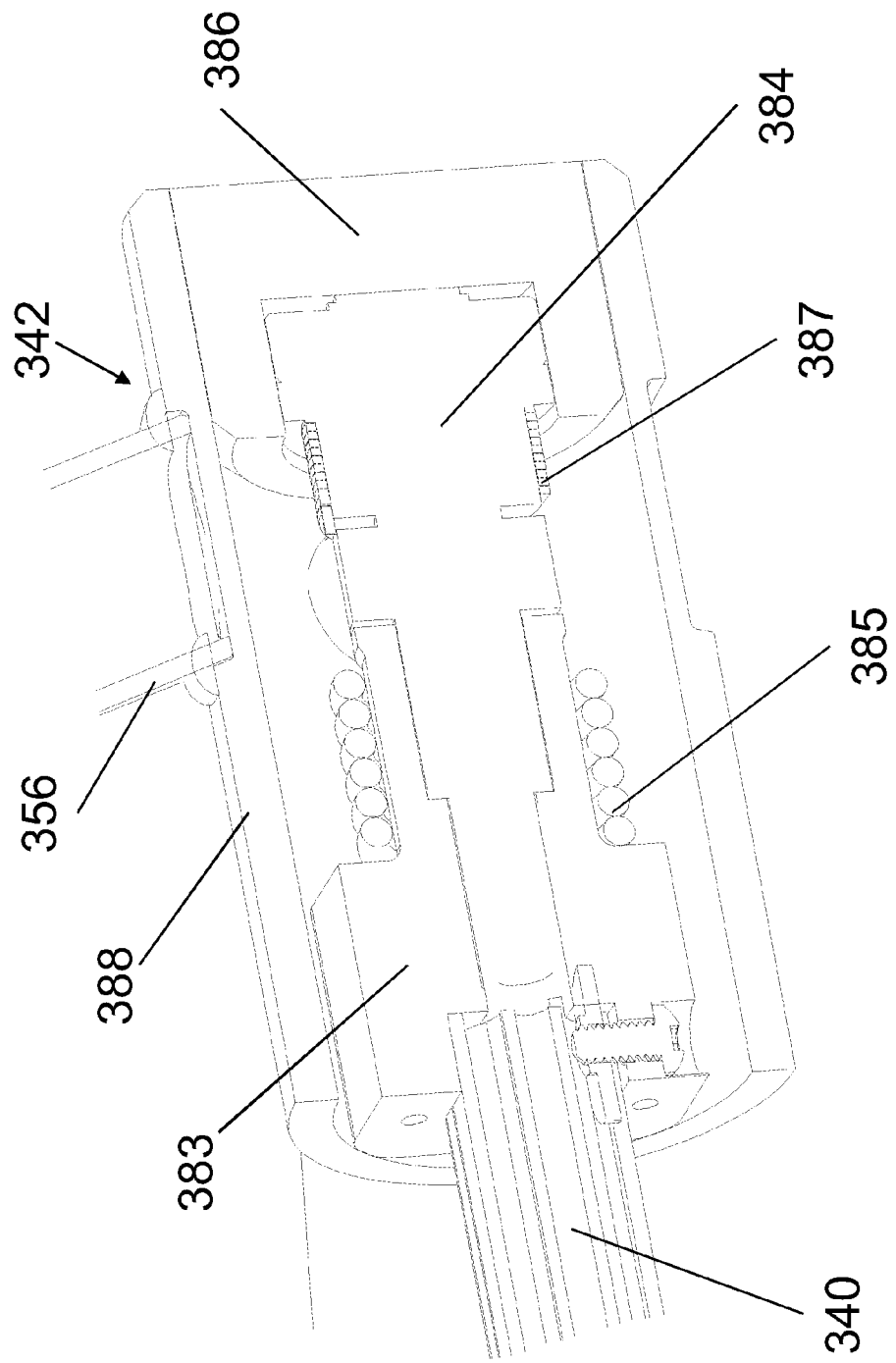
FIG. 24 is a view of a cross section of one of the pivot mechanisms shown in FIG. 21.

As shown in FIG. 24, first pivot mechanism 342 defines a wrap spring clutch. A wide variety of pivot mechanisms in addition or alternatively to a wrap spring clutch are envisioned. In the example shown in FIG. 24, first pivot mechanism 342 includes a fixed shaft 383, a rotatable shaft 384, a support spring 385, an end cap 386 defining a bearing, a wrap spring 387, and an outer housing 388.

Fixed shaft 383 defines a hub portion and a neck portion extending from the hub portion. Fixed shaft 383 further defines a bore extending through the hub portion and the neck portion. The hub portion is mounted to elongate base member 340 and abuts outer housing 388. The neck portion defines a neck contact face on the end of the neck portion opposite the hub.

Wrap spring 387 wraps around rotating shaft 384 and exerts a bias on the rotating shaft 384 toward fixed shaft 383. The bias exerted by wrap spring 387 serves to inhibit frame 344 from pivoting under the weight of cargo serving to generate a moment about the pivot axis.

In the examples shown in FIG. 24, the tension of support spring 385 at operational compression helps maintain the rotational position of frame by resisting a moment of approximately 700 inch-pounds. In other examples, support springs are selected to resist moments with magnitudes between 500 and 1500 inch-pounds, and more preferably to resist moments with magnitudes of between 700 and 1000 inch-pounds. In the event that heavier cargo is to be supported, support springs with compressions sufficient to resist moments greater than 1500 inch-pounds, such as 2000 inch-pounds, 2500 inch-pounds, or greater may be selected. The compression and resilience of support spring 385 also assists a user to pivot the frame, especially when supporting a heavy load, by bearing a significant portion of the downward torque generated by the cargo.

Rotatable shaft 384 is mounted within the bore of fixed shaft 383 on one end and mounted within end cap 386 on the other end. Rotatable shaft may rotate within end cap 386 and within fixed shaft 383, except as described below.

Rotatable shaft 384 includes an extension portion and a wider diameter body portion. The extension portion extends into the bore of fixed shaft 383 up to a maximum depth defined by where a leading face of the body portion of rotatable shaft 384 abuts the neck contact face. The neck contact face inhibits the rotatable shaft from rotating when the rotatable shaft abuts the neck contact face.

Wrap spring 387 is coiled around the body portion of rotatable shaft and biases the leading face of the body portion into abutment with the neck contact face. Thus, wrap spring 387 biases rotatable shaft into a non-rotation position abutting fixed shaft 383. As explained in more detail below, the bias of wrap spring 387 in pivot mechanism 342 is selectively overcome by triggering release mechanism 390.

Figure 23:
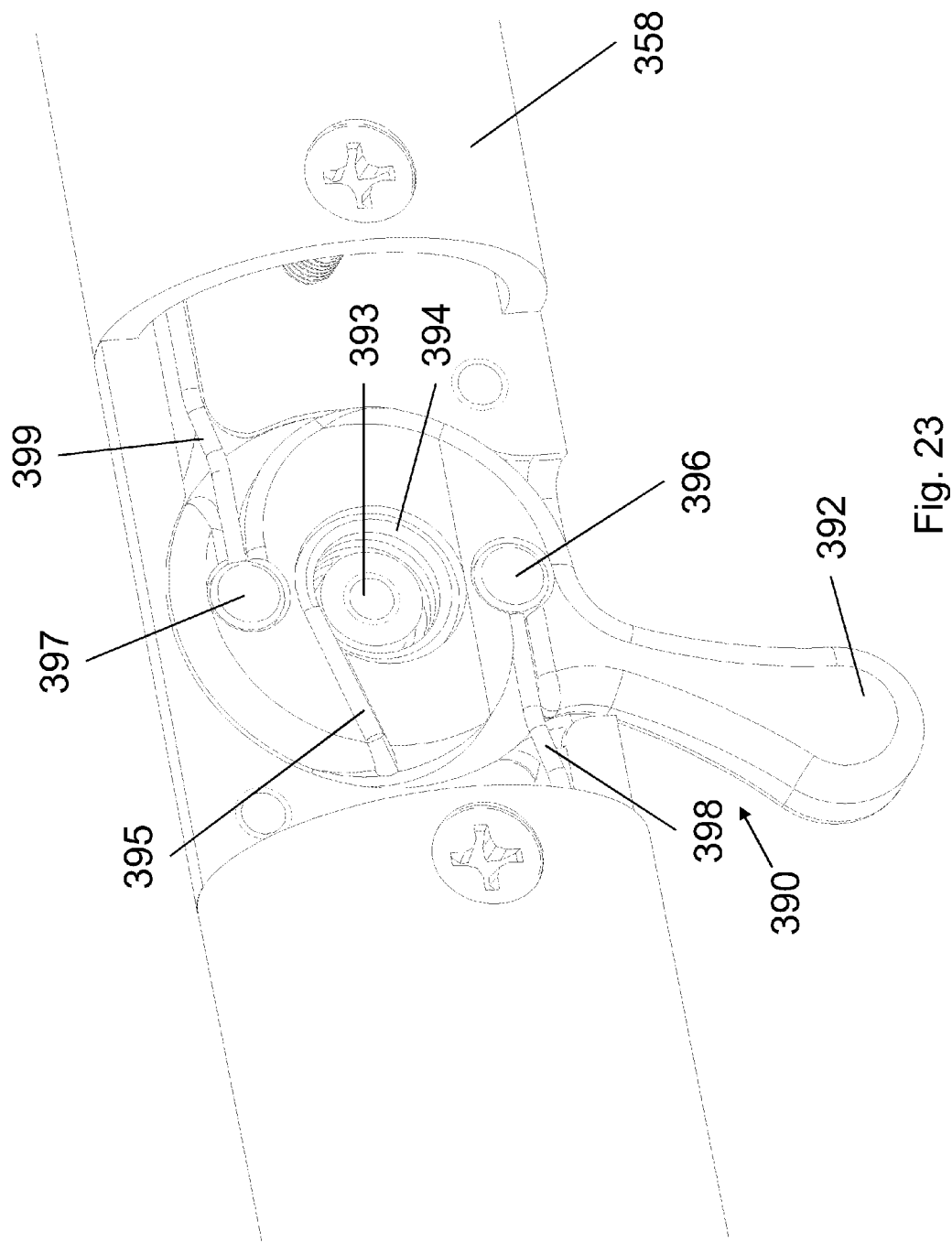
FIG. 23 is a close up view of the release mechanism shown in FIG. 21 with a portion of the frame removed to shown components of the release mechanism.

As shown in FIG. 23, release mechanism 390 includes a trigger 392, a shaft 393, a release spring 394, a tang 395, a first anchor 396, a second anchor 397, a first cable 398 and a second cable 399. Trigger 392 defines a handle portion and a body portion defining a central aperture. Shaft 393 extends through the central aperture and trigger 392 rotates around shaft 393. Trigger 392 rotates between a fixed position where the pivot mechanisms hold frame 344 in a fixed position relative to elongate base member 340 and a release position (shown in FIG. 23) where the pivot mechanisms allow frame 344 to rotate relative, to elongate base member 340.

Coiled around shaft 393 is a release spring 394 biasing trigger 392 towards the fixed position. Release spring 394 terminates at tang 395 on one end abutting trigger 392 and is connected to second support member 358 on an opposite, second end. Manually rotating trigger 392 about shaft 393, such as with a user's thumb, constricts release spring 394. Upon releasing trigger 392, release spring 394 expands to its unconstructed position and rotates trigger 392 back to the fixed position.

Fixedly mounted within the body portion of trigger 392 are first anchor 396 and second anchor 397. First cable 398 is connected to first anchor 396 on one end and to the second pivot mechanism on the other end. Second cable 399 is connected to second anchor 397 on one end and to the pivot mechanism 342 on the other end.

Rotating trigger 392 about shaft 393 causes the first and second anchors to move between tension and slack positions. In the tension position, the anchors pull on their respective cables and generate at least a threshold tension in the cable. The threshold tension is the tension selected to release the bias compression of the wrap springs in the pivot mechanisms. In the slack positions (shown in FIG. 23), the anchors exert relatively less tension on the cables. In particular, the slack position reduces the tension in the cables below the threshold tension.

As initially introduced above, the bias of wrap spring 387 in pivot mechanism 342 is selectively overcome by triggering release mechanism 390. Cable 399 is connected to a tang of wrap spring 387 and releases the spring tension of wrap spring 387 when cable 399 is tensioned above the threshold tension. As discussed above, cable 399 is tensioned by moving trigger 392 from the fixed position (shown in FIG. 23) to the release position causing anchor 397 to on cable 399.

Figure 25:
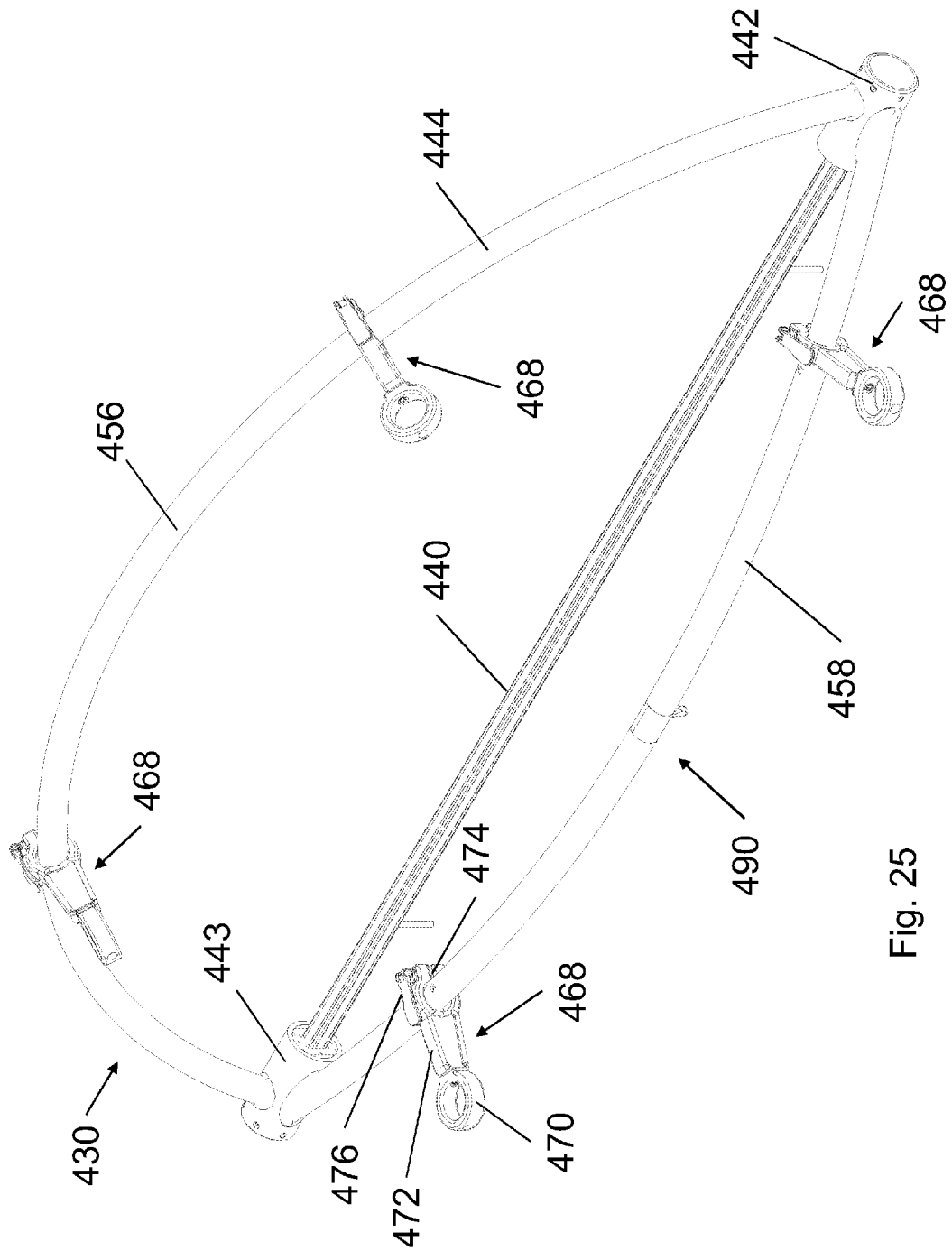
FIG. 25 is a perspective view of a fifth example of a carrier rack, the carrier rack being configured to support a kayak.

Turning attention to FIGS. 25 and 26, a fifth example of a carrier rack will now be described. Carrier rack 430 shown in FIGS. 25 and 26 includes many similar or identical features to carrier racks 30, 130, 230, and 330. Accordingly, each feature of carrier rack 430 will not be redundantly explained. Rather, key distinctions between carrier rack 430 and carrier racks 30, 130, 230, and 330 will be described in detail. The reader may reference the discussion above for features substantially similar between the carrier racks.

FIG. 26 demonstrates that carrier rack 430 is adapted for supporting cargo 436 in the form of watercraft. In the particular example shown in FIG. 26, carrier rack 430 is supporting a kayak. However, carrier rack 430 may support and secure a wide variety of cargo beyond watercraft.

With reference to FIGS. 25 and 26, carrier rack 430 includes an elongate base member 440, a first pivot mechanism 442, a second pivot mechanism 443, a frame 444, and a release mechanism 490. Frame 444 includes a first support member 456 and a second support member 458. Frame 444 pivots between a loading position and a stowed position.

Cargo rack 430 includes a plurality of cargo mounts 468 mounted to frame 444. In the particular example shown in FIGS. 25 and 26, cargo rack 430 includes four separate cargo mounts. As shown in FIG. 26, cargo mount 468 provides a mounting point for anchoring or securing an elongate tension bearing member 469 used to secure cargo. In the particular example shown in FIG. 26, elongate tension bearing member 469 is a strap, but in different examples the elongate tension bearing member is a rope, cord, bungee cord, or chain.

Cargo mount 468 includes a ring 470, a neck 472, a clamp 474, and a lever 476. Ring 470 is mounted to a first end of neck 472 and receives elongate tension bearing member 469. Clamp 474 defines curved clamping faces complimenting and surrounding, selectively in tight abutment, the cylindrical shape of either first support member 456 and second support member 458. A user may pivot lever 476 to selectively squeeze the clamping faces onto the support member surrounded by clamp 474 or to selectively release the clamping pressure. When the clamping pressure is released, cargo mount 468 may slide relative to the support member to which it is mounted, enabling a user to position cargo mount into a wide range of desired positions.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A carrier rack mounted to a vehicle for transporting cargo in a position above a roof of the vehicle, comprising:
    an elongate base member;
    a pivot mechanism mounted to the elongate base member and configured to rotate relative to the elongate base member;
    a frame coupled to the pivot mechanism for supporting cargo, the frame including a first support member substantially defining a first plane and a second support member substantially defining a second plane transverse to the first plane;
    a first cargo mount coupled to the first support member for securing cargo to the first support member; and
    a second cargo mount coupled to the second support member for securing cargo to the second support member, the second cargo mount defining a trough and including a restraining member for securing cargo within the trough;
    wherein the pivot mechanism is configured to pivot the frame between a loading position and a stowed position for transport, the first support member being oriented substantially horizontal above the roof of the vehicle in the stowed position.

2. The carrier rack of claim 1, wherein the first support member is substantially vertical in the loading position, the first support member pivoting approximately 90° between the loading position and the stowed position.

3. The carrier rack of claim 1, wherein the first support member is substantially horizontal in the loading position, the first support member pivoting approximately 180° between the loading position and the stowed position.

4. The carrier rack of claim 1, wherein the first support member is substantially vertical in the loading position, the first support member pivoting approximately 270° between the loading position and the stowed position.

5. The carrier rack of claim 1, wherein the vehicle defines a periphery when viewed from above and the second support member extends beyond the periphery in the loading position and the second support member is within the periphery in the stowed position.

6. The carrier rack of claim 1 wherein the plane defined by the first support member is oriented perpendicular to the plane defined by the second support member.

7. The carrier rack of claim 1, wherein:
    the elongate base member includes a first end longitudinally opposite a second end;
    the pivot mechanism includes a first pivot mechanism mounted to the first end and a second pivot mechanism mounted to the second end; and
    the first support member extends from the first pivot mechanism to the second pivot mechanism; and
    the second support member extends from the first pivot mechanism to the second pivot mechanism.

8. The carrier rack of claim 1, wherein the first cargo mount is slidingly and selectively coupled to the first support member to enable the first cargo mount to secure cargo to the first support member from a desired position along the first support member.

9. The carrier rack of claim 1, wherein at least one of the first and second cargo mounts are specially configured to mount a bicycle.

10. The carrier rack of claim 1, further comprising an aerodynamic shield mounted to the frame at a forward position of the frame proximate a front of the vehicle.

11. The carrier rack of claim 10, wherein the aerodynamic shield has a shield profile in the direction of airflow large enough to cover a corresponding frame profile of the frame and deflect airflow at least substantially around the frame.

12. The carrier rack of claim 10, wherein the aerodynamic shield defines a cavity and a portion of the frame extends into the cavity.

13. A carrier rack for securing cargo on a vehicle having a roof rack, comprising:
    an elongate base member;
    a pivot mechanism mounted to the elongate base member and configured to selectively rotate relative to the elongate base member, the pivot mechanism including a spring clutch mechanism;
    a frame extending from the pivot mechanism;
    a release mechanism mounted to the frame and including a cable connected to the spring clutch mechanism, the release mechanism being movable between a release position applying at least a threshold tension to the cable and a fixed position reducing tension in the cable below the threshold tension,
    wherein the spring clutch mechanism allows the pivot mechanism to rotate when the release mechanism increases the tension in the cable to at least the threshold tension and restricts the frame from rotating when the release mechanism reduces tension in the cable below the threshold tension.

14. The carrier rack of claim 13, wherein the pivot mechanism includes:
    a fixed shaft mounted to the elongate base member and defining a bore;
    a rotatable shaft mounted partially within the bore; and
    a wrap spring compressed against the rotatable shaft and biasing the rotatable shaft into tight abutment with the fixed shaft,
    wherein the cable is connected to the wrap spring and the cable reduces the compression of the wrap spring when the release mechanism selectively increases the tension in the cable to at least the threshold tension.

15. The carrier rack of claim 14, wherein the release mechanism includes:
    a trigger pivotally mounted about a fixed shaft and configured to pivot between the fixed position and the release position;

wherein the cable is connected to the trigger and the trigger increases the tension in the cable to at least the threshold tension when the trigger pivots to the release position.

16. A carrier rack mounted to a vehicle for transporting cargo in a position above a roof of the vehicle, comprising:
   an elongate base member;
   a pivot mechanism mounted to the elongate base member and configured to rotate relative to the elongate base member;
   a frame coupled to the pivot mechanism for supporting cargo, the frame including a first support member substantially defining a first plane and a second support member substantially defining a second plane transverse to the first plane;
   a first cargo mount coupled to the first support member for securing cargo to the first support member, the first cargo mount including:
      a clamp defining an opening complimenting the shape of the first support member; and
      a lever coupled to the clamp and configured to selectively compress the clamp onto the first support member and to selectively release the compression of the clamp onto the frame to enable the first cargo mount to move relative to the first support member; and
   a second cargo mount coupled to the second support member for securing cargo to the second support member;
   wherein the pivot mechanism is configured to pivot the frame between a loading position and a stowed position for transport, the first support member being oriented substantially horizontal above the roof of the vehicle in the stowed position.

17. The carrier rack of claim 16, wherein the vehicle defines a periphery when viewed from above and the second support member extends beyond the periphery in the loading position and the second support member is within the periphery in the stowed position.

18. The carrier rack of claim 16, further comprising an aerodynamic shield mounted to the frame at a forward position of the frame proximate a front of the vehicle.

19. The carrier rack of claim 18, wherein the aerodynamic shield has a shield profile in the direction of airflow large enough to cover a corresponding frame profile of the frame and deflect airflow at least substantially around the frame.

20. The carrier rack of claim 18, wherein the aerodynamic shield defines a cavity and a portion of the frame extends into the cavity.

* * * * *